June 17, 1941.  W. D. MOUNCE  2,245,700
RESISTANCE THERMOMETER
Filed Oct. 8, 1937
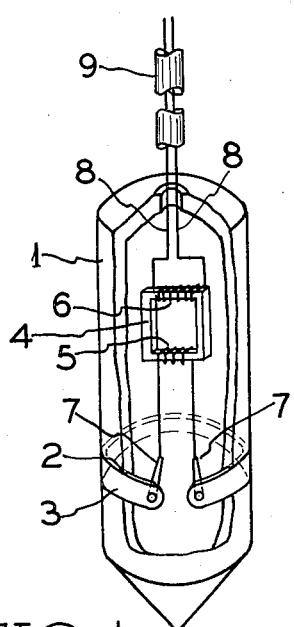
FIG_1_
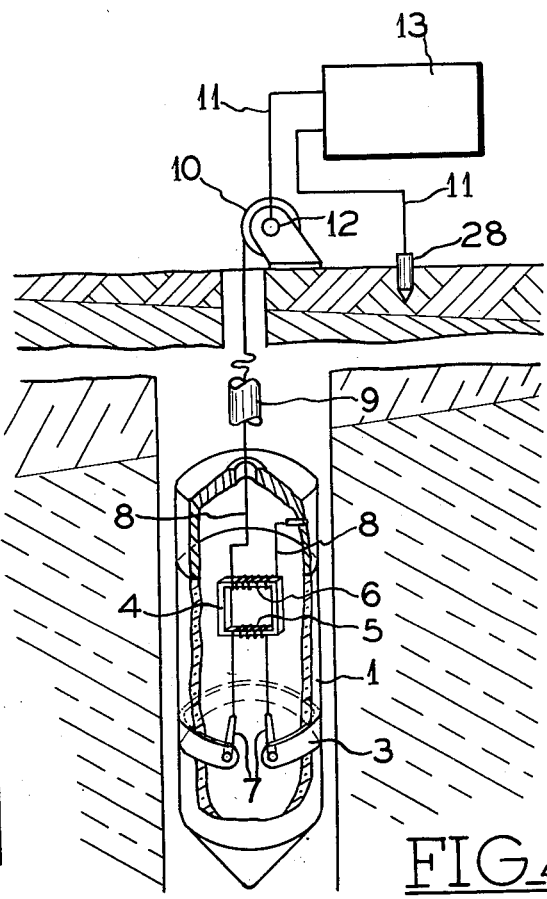
FIG_4
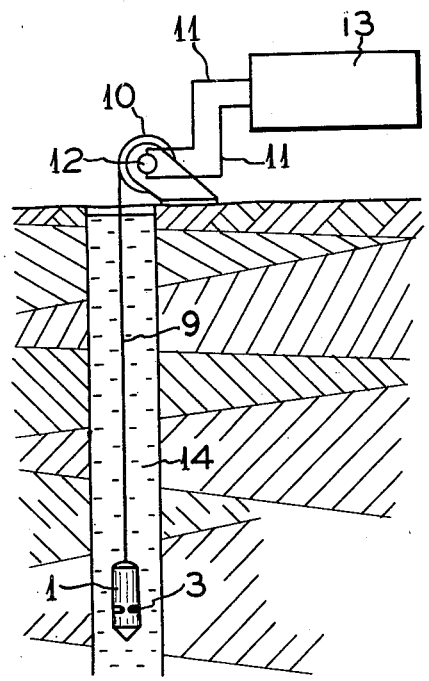
FIG_2_
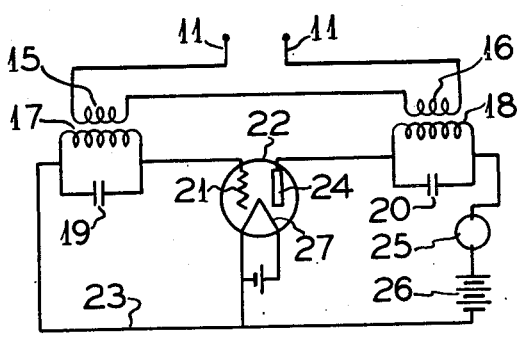
FIG_3_
Whitman D. Mounce INVENTOR.
BY P. L. Young ATTORNEY.

Patented June 17, 1941

2,245,700

UNITED STATES PATENT OFFICE 2,245,700

RESISTANCE THERMOMETER

Whitman D. Mounce, Houston, Tex., assignor to Standard Oil Development Company, a corporation of Delaware Application October 8, 1937, Serial No. 167,965

10 Claims. (Cl. 73—362)

This invention is directed to a method and apparatus for recording the temperatures at various levels in a borehole filled with a fluid.

In an investigation of the properties of the materials surrounding a borehole, information significant of structural and artificial conditions may be obtained by an accurate continuous measurement of the temperature of the fluid in the borehole. Various instruments for making this measurement have been devised, but all have the common fault of requiring a considerable length of time for the measuring element to reach thermal equilibrium with the surrounding fluid. This failing is due to the fact that either the measuring element has an undesirably high heat capacity or, in the case of electrical instruments, that it must be insulated electrically from the surrounding drilling fluid, which is ordinarily an electrolyte. Since all materials which are good electrical insulators are correspondingly poor thermal conductors, the insulation necessarily increases the time required for the element to reach thermal equilibrium with the surrounding fluid.

Nearly all electrical thermometers utilize either a thermocouple or the change of resistance of a conductor with temperature. For the small variations of temperature encountered in a well, an instrument of high sensitivity is required. Variations of one tenth of one degree centigrade should be detectable. If thermocouples are used, several hundred elements would have to be connected in series in order to obtain a detectable potential variation for a temperature of .1° C. Furthermore, such an instrument would be extremely delicate, would require a high degree of electrical insulation, and, consequently, would take a long time to reach thermal equilibrium with the surrounding fluid.

There are similar objections to the ordinary resistance thermometer. In order to obtain a satisfactory sensitivity, and to have the measurements unaffected by changes in the temperature of the cable, the resistance of the measuring element must be large compared with the resistance of the conductor cable. For a cable of reasonable dimensions with a length of 10,000 feet, it would be required that the measuring element have a resistance of at least several hundred ohms. A resistance of this value exposed to the electrolyte in the well would in effect be short circuited. Consequently, electrical insulation would be required, and the element would take a long time to reach thermal equilibrium.

It is an object of this invention to overcome these disadvantages and to provide a borehole thermometer permitting temperature measurements at high cable speeds, say 200 feet per minute, in cased or uncased boreholes.

Figure 1 is a perspective view of a device according to the present invention with a portion thereof broken away to reveal the interior.

Figure 2 is a diagrammatic representation of the use of the device of the present invention in a borehole.

Fig. 3 is a diagrammatic illustration of a circuit constituting one form of impedance meter.

Fig. 4 is a front elevation of a modification of the arrangement shown in Fig. 1, with a portion of the apparatus broken away to reveal interior construction.

Referring to the drawing in detail, 1 designates a casing which may be of any desired form and is shown in the drawing as a cylindrical bomb composed of Bakelite or other insulating material. Arranged in a circumferential groove 2 in Fig. 1 is a strip of metallic material 3 which may be copper, platinum or any other good conductor of heat and electricity. As shown in the drawing, this conductor is of a thickness such that the outer surface lies flush with the outer surface of casing 1. The purpose of this arrangement is to subject the exposed surface of the conductor strip to the abrasive action of the mud employed in drilling and thereby prevent the accumulation on the conductor of any chemical film which would retard the rate of heat transfer from the fluid to the element.

Supported within casing 1 in any suitable manner, is the core 4 of a transformer having a primary winding 5 and a secondary winding 6. Primary winding 5 is connected in series with strip 3 by conductors 7. Hereinafter the primary winding and the strip 3 will be referred to as the detector circuit.

Secondary winding 6 is connected to a pair of conductors 8 which are contained in a cable 9 which is attached to a hoisting drum 10, by means of which casing 1 is moved up and down a borehole filled with drilling fluid 14. Electrical connection is made between the conductors 8 and a pair of conductors 11 through a slip ring arrangement 12. Conductors 11 are connected with an impedance meter 13 which may be of any conventional type. Secondary winding 6, conductors 8, conductors 11 and impedance meter 13 will be hereinafter referred to as the recording circuit.

The essence of the arrangement above described lies in the proper selection of the impedances of the two circuits. To begin with in the detector circuit the impedance of strip 3 should be extremely small in comparison to the impedance of the fluid surrounding the casing. The purpose of this is to insure that the current supplied through the strip will not leak out into the fluid surrounding the strip. In practice, for the drilling fluids encountered, $\frac{1}{10}$ of an ohm is a suitable value for the resistance of strip 3.

In addition, in the detector circuit, the impedance of the primary winding 5 must match the impedance of the strip 3. That is to say, the impedance of the strip 3 must be a substantial part of the impedance of the detector circuit. Preferably, the impedance of the primary winding 5 is approximately equal to the impedance of the strip 3.

The ratio between the secondary winding and the primary winding of the transformer should be such that a small change in the impedance of the latter will be reflected as a large change in the impedance of the former. Of course, the ratio of the impedance change to the impedance of the secondary winding is limited by the ratio of the change of the impedance to the impedance of strip 3, and the former ratio is never quite as large as the latter. The transformer simply serves to make the magnitude of the values such that they may be measured at the surface through the conducting cable which is in series with the secondary and the measuring circuit.

In the recording circuit the impedance of the secondary 6 of transformer 4 should constitute a substantial part of the impedance of the circuit. Preferably, the impedance of secondary 6 should equal the impedance of the remainder of the recording circuit. In other words, the impedance of the secondary winding may be said to match the impedance of the remainder of the recording circuit.

The use of a detector element such as element 3 which has a small heat capacity and is not insulated from the surrounding fluid in the well, enables the instrument to reach thermal equilibrium in an extremely short time. Hence, it is possible to make continuous temperature measurements in a borehole by moving the instrument through the hole at a rate of several hundred feet per minute without stopping at intermediate points.

The circuit of the impedance meter is shown in Fig. 3. Conductors 11 are connected through induction coils 15 and 16 arranged in series. Coil 15 is inductively coupled with coil 17 which, together with condenser 19, connected in parallel therewith, constitutes the tuned-grid circuit of an oscillator which is connected to grid 21 of a vacuum tube 22 and to the common conductor 23.

Coil 16 is inductively coupled with coil 18 which together with condenser 20 connected in parallel therewith constitutes the tuned-plate circuit of the oscillator, which is connected to plate 24 of the vacuum tube, recorder 25 and plate battery 26 which are all connected in series. Battery 26 is also connected to the common conductor 23. Filament 27, of the vacuum tube, is also connected to the common conductor 23.

Variations in impedance between terminals 11, that is, variations in impedance in the detector circuit, will vary the coupling between the grid circuit and the plate circuit, thus, as is well known, varying the direct component of the plate current. Thus, the current shown by the recorder 25 is a function of the impedance of the detector circuit.

It is apparent that any conventional impedance meter may be employed instead of that specifically described above. For example, any of the impedance meter circuits disclosed in application, Serial Number 160,213, filed August 21, 1937, may be employed.

The modification illustrated in Fig. 4 differs from that illustrated in Figures 1 and 2 in that instead of both conductors 11 being connected to secondary winding 6 one conductor is connected in series with this winding and the other conductor is connected with an electrode which is inserted in the ground at the surface, the other end of secondary winding 6 being connected to casing 1. In Fig. 4 the upper part of casing 1 is shown to be metallic. As shown in Fig. 4 only one of conductors 8 passes upwardly through cable 9 to the hoisting drum. Likewise, only one of conductors 11 is connected to slip ring 12. The other conductor 8 connects secondary winding 6 to the metallic portion of the casing 1. The other conductor 11 is connected to an electrode 28 which is stuck into the surface of the earth at the borehole.

In this modification of the present invention it is necessary that the impedance of secondary winding 6 be selected so large that changes in the current in the recording circuit will be due mainly to changes in the impedance of secondary winding 6 as distinguished from changes in impedance in the earth. That is to say, the ratio between secondary winding 6 and primary winding 5 should be so large that changes in impedance of the detector circuit will be so greatly magnified in the recording circuit as to eliminate the effect of any changes in earth impedance which it included in the recording circuit.

The method of the present invention is particularly applicable to the location of the top of the cement behind the casing in a cased hole, especially, when the method is applied to the hole while cement is still giving off heat. Because of the high sensitivity of the recording circuit employed, it is also possible to employ the method for this purpose even after the heat of setting of the cement has subsided. It is often advantageous to introduce into the borehole a liquid having a higher temperature than the strata surrounding the borehole and to allow some time for heat equilibrium to be reached before lowering the measuring element into the borehole.

The nature and objects of the present invention having been thus described and illustrated, what is claimed as new and useful and is desired to be secured by Letters Patent is:

1. A device for measuring temperature in a borehole filled with fluid comprising an uninsulated electrical conductor arranged for free heat exchange with the fluid in the borehole and having a resistance which is small compared to that of the fluid in the borehole and which is variable with temperature, means for moving the conductor along the borehole, means for supplying alternating current to said conductor and means for measuring changes in the impedance of the conductor.

2. A device for measuring temperature in a borehole filled with fluid comprising an uninsulated electrical conductor arranged for free heat exchange with the fluid in the borehole and having an electrical resistance which is small compared with that of the fluid in the borehole and which is variable with temperature, means for moving the conductor along the borehole, an impedance meter for measuring the impedance of the conductor and a transformer connecting the conductor to the impedance meter and matching the impedance of the conductor to that of the impedance meter.

3. A device for measuring the temperature in a borehole filled with fluid comprising an electrical circuit having an uninsulated conductor arranged for free heat exchange with the fluid in the borehole, said conductor having a resistance which is small compared to that of the fluid in the borehole and is variable with temperature and having an impedance which is a substantial part of the impedance of the electrical circuit, means for moving the electrical circuit along the borehole and means for recording changes in impedance in said circuit.

4. An apparatus for continuously and automatically recording temperature variations in a fluid in a borehole which comprises a movable element adapted to be moved along the borehole, an uninsulated resistance element carried by said movable element in free heat exchange relation with the fluid in the borehole and having a resistance which is small compared to that of the fluid in the borehole and which is variable with temperature, an impedance meter located at the surface adjacent the borehole and an electrical circuit connecting said resistance element to the impedance meter including a transformer, one winding of which is connected to the resistance element and has an impedance not substantially greater than the impedance of the resistance element and the other winding of which is connected to the impedance meter and has an impedance not substantially less than that of the impedance meter.

5. An apparatus for continuously and automatically recording temperature variations in a fluid in a borehole which comprises a bomb-like casing attached to the end of a cable adapted to raise and lower it in the borehole, an impedance meter adapted to be arranged adjacent the borehole on the surface, a transformer in said casing, having primary and secondary windings, an electrical connection between the secondary of said transformer and the impedance meter and an electrical conductor arranged on said casing in such position as to be in free heat exchange relation with the fluid in the borehole, when the casing is in the borehole, and connected to the primary of said transformer.

6. An apparatus, according to the preceding claim, in which the impedance of the electrical conductor carried by the casing constitutes at least about one-half of the impedance of the circuit composed of said conductor and the primary of the transformer.

7. An apparatus, according to claim 5, in which the electrical conductor carried by the casing has a resistance which is small compared to that of the fluid in the borehole and is variable with temperature and has an impedance which is at least about one-half of the impedance of the circuit composed of said conductor and the primary of the transformer.

8. An apparatus, according to claim 5, in which the impedance of the secondary of the transformer is about equal to that of the impedance meter.

9. An apparatus, according to claim 5, in which the impedance of the conductor carried by the casing is about equal to that of the primary of the transformer and the impedance of the secondary of the transformer is about equal to that of the impedance meter.

10. An apparatus for continuously and automatically recording temperature variations in a fluid in a borehole which comprises a hollow electrode adapted to be moved along the borehole, a resistance element carried by said electrode and arranged for free heat exchange relation with the fluid in the borehole, a transformer mounted in said electrode having one of its windings connected in series with said resistance element, an impedance meter and a source of power adapted to be arranged at the surface, and a single conductor cable connecting said electrode to said impedance meter and source of power, said conductor being connected in the electrode to one terminal of the other winding of said transformer the remaining terminal of said other winding being arranged for electrical contact with the fluid in the borehole whereby a ground connection is provided between said remaining terminal and said impedance meter and source of power.

WHITMAN D. MOUNCE.